United States Patent
Kamphuis

(10) Patent No.: US 7,333,823 B2
(45) Date of Patent: Feb. 19, 2008

(54) METHOD AND SYSTEM FOR CHECKING THE ATTAINABILITY STATUS OF A MOBILE TERMINAL DEVICE

(75) Inventor: Robert Kamphuis, Helsinki (FI)

(73) Assignee: Nokia Siemens Networks Oy, Espoo (FI)

(*) Notice: Subject to any disclaimer, the term of this patent is extended or adjusted under 35 U.S.C. 154(b) by 0 days.

(21) Appl. No.: 10/509,783

(22) PCT Filed: Apr. 3, 2002

(86) PCT No.: PCT/IB02/01044

§ 371 (c)(1),
(2), (4) Date: Sep. 29, 2004

(87) PCT Pub. No.: WO03/084260

PCT Pub. Date: Oct. 9, 2003

(65) Prior Publication Data

US 2005/0148350 A1   Jul. 7, 2005

(51) Int. Cl.
*H04Q 7/00* (2006.01)

(52) U.S. Cl. .................................. 455/466

(58) Field of Classification Search ............ 455/412.2, 455/466, 456.3, 456, 426.1, 455, 433; 370/349
See application file for complete search history.

(56) References Cited

U.S. PATENT DOCUMENTS

| | | | |
|---|---|---|---|
| 5,930,701 A | 7/1999 | Skog | 455/415 |
| 5,940,756 A * | 8/1999 | Sibecas et al. | 455/426.1 |
| 6,208,870 B1 | 3/2001 | Lorello et al. | 455/466 |
| 6,424,841 B1 * | 7/2002 | Gustafsson | 455/466 |
| 6,459,904 B1 * | 10/2002 | Lorello et al. | 455/466 |
| 6,658,260 B2 * | 12/2003 | Knotts | 455/466 |
| 6,748,229 B1 * | 6/2004 | Calatrava-Requena et al. | 455/466 |
| 6,928,290 B2 * | 8/2005 | Byers et al. | 455/455 |
| 2003/0003935 A1 * | 1/2003 | Vesikivi et al. | 455/517 |
| 2003/0091020 A1 * | 5/2003 | Bantukul et al. | 370/349 |
| 2003/0125042 A1 * | 7/2003 | Olrik et al. | 455/456 |
| 2004/0053629 A1 * | 3/2004 | Rueger et al. | 455/466 |

FOREIGN PATENT DOCUMENTS

| | | |
|---|---|---|
| EP | 1091601 A2 | 4/2001 |
| WO | WO 01/56312 A1 | 8/2001 |

* cited by examiner

*Primary Examiner*—Joseph Feild
*Assistant Examiner*—Kiet Doan
(74) *Attorney, Agent, or Firm*—Ware, Fressola, Van Der Sluys & Adolphson

(57) ABSTRACT

Method for executing a communication attempt with a mobile terminal device in accordance with an attainability status of a mobile terminal device in a cellular communication network having a Short Message Service Center by: querying the SMSC in the cellular network for obtaining the attainability status of said mobile terminal device and delivering said communication attempt to said mobile terminal device in accordance with said attainability status. This invention allows an application to find out if a mobile terminal device e.g. a handset is reacheable without actually contacting the handset. A short message service center does this by initiating a mobile terminated delivery attempt but not finishing it but telling the application instead if the home location register of a cellular network thinks the handset is reacheable or not.

12 Claims, 2 Drawing Sheets

METHOD AND SYSTEM FOR CHECKING THE ATTAINABILITY STATUS OF A MOBILE TERMINAL DEVICE

CROSS-REFERENCE TO RELATED APPLICATION

This application is the U.S. National Stage of International Application Number PCT/IB02/01044 filed Apr. 3, 2002 and published in the English language on Oct. 9, 2003 under International Publication Number WO 03/084260 A1 with International Search Report.

BACKGROUND OF THE INVENTION

1. Technical Field

The present invention relates to cellular communication networks having the option to send short messages. It also relates to a method to deliver communication attempts in accordance with the determined attainability of a mobile terminal device. The present invention relates to a method to deliver communication attempts to mobile terminal devices with a minimized use of wireless connections. The invention further relates to a mechanism inside a Short Message Service Center (SMSC) to provide notifications for calling applications or network devices for informing them if mobile devices are reachable or not, and if they are reachable via General Packet Radio Service (GPRS) or Global System for Mobile communication (GSM).

2. Discussion of Related Art

Currently, in order to find out if a mobile terminal device is attainable, an application can send a Short Message (SM) to a handset and based on the result of the delivery of this SM the application knows if the handset is reachable or not. This implies also that the SM is actually delivered if the phone is reachable. Examples of this are push-type services which would benefit by not pushing to many subscribers when these are not reachable. E.g. a football score application would at the start of the match 'poll' all one hundred thousand fans and reduce the list down to just twelve thousand subscribers currently reachable. During the match, the amount of data pushed will be reduced dramatically and the resources used (without charging for it) is minimized.

Sometimes it would be desirable to know the reachability status without disturbing the terminal device. Presently, the SMs are sent anyway. There are some ways in the European Telecommunication Standard Institute (ETSI) specifications to send an SMS which the phone 'may discard' but it is not clear if all phones will comply with this procedure or not. In this case the air-interface capacity is used if the phone is reachable. In practice most applications just send all the stuff to all handsets and the SMSC capacity is wasted, and many more paging attempts are accordingly made as a result.

The standard procedures for delivering SMs can be found in the ETSI specifications for GSM and in the 3rd Generation Partnership Project (3GPP) specifications for the Short Message Service (SMS).

The main drawback of this standard procedure is that the mobile user has to get rid of these SMs pushed to him just to find out the status of the terminal device.

DISCLOSURE OF INVENTION

So it is desirable to have a method and a device capable of determining the attainability of a mobile terminal device without disturbing it.

So it is desirable to have a method and a device capable of determining the attainability of a mobile terminal device without using air interfaces.

According to one embodiment of the invention a method, for executing a communication attempt with a mobile terminal device in accordance with the attainability status of said mobile terminal device in a cellular communication network is provided. The cellular network has a Short Message Service Center (SMSC), to manage and administer short messages (SM). The method is executed by querying said SMSC in said cellular network for obtaining an attainability status of said mobile terminal device and delivering said communication attempt to said mobile terminal device in accordance with said attainability status.

By querying the SMSC the information related to the attainability status can be obtained, and subsequently a communication attempt can be delivered, if the attainability status meets the attainability demands of said communication attempt. The communication attempt can be one or more of the following: a SM, a plurality of SMs or multimedia messages (MMs) of a multimedia messaging service (MMS) to be delivered, a fax, an email, a phone call to be executed. The delivery of the communication attempt can be a forwarding of one or more SMs, MMs, emails faxes or phone calls. The delivery of said communication attempt may be notified by a message returned to the originator of the query. If the attainability is denied, the communication attempt is not delivered or at least postponed. If the attainability is confirmed the communication attempt is delivered or delivery is at least tried.

Preferably, said query of said SMSC further comprises a query of a Home Location Register (HLR) of the cellular communication network for an attainability status of said mobile terminal device. By querying the HLR entries of the mobile terminal device, it can be found out in which cell the mobile terminal actually is located, or in which cell it has been detected to be the last time. The query can be started by the SMSC, an application running of said SMSC or by a device or application connected to the SMSC.

Conveniently, said attainability status is obtained by evaluating connection related data stored in said SMSC and/or said HLR. By evaluating the data, it can be determined if the communication attempt to be executed is deliverable or if it would be better to delay or cancel the delivery of said communication attempt. As the data stored in the SMSC and the HLR may be not useable for easily determining the attainability, it can be used to evaluate the connection related data. The result of said evaluation can be an "attainable" state, an "unattainable" state or a "conditionally attainable" state.

This is useful, if an application or a device wants to send a lot of SMs to a mobile terminal device e.g. multi-track midi-ringing tones, games, software downloads, phonebook (all two hundred entries) etc. it is useful to first find out if this would work or not.

A second example is a mass-delivery server which is adapted to deliver some messages (football scores, advertisements, and the like) to many subscribers (one hundred thousand and more) and to optimize this, and wants to query who is 'online' to reduce the total volume. Preferably, if the state of a mobile station is determined as "not attainable" at the beginning of a (football) game, the whole following transmissions of actual scores of the game may be cancelled.

Advantageously, said connection related data are related to messages pending for delivery to said mobile terminal device. In the simplest case the network device e.g. queries an SMSC to find out if there are already SMs for a terminal device pending for delivery, and cancels or queues the delivery if there are SMs pending for delivery. If the device already rejected to receive a SM, an additional SM delivery would surly fail, and therefore may be economized. It may happen that the delivery of the SMS pending is delayed, because of a delay in the updating of the Home Location Register, or a delay in the updating of the SMSC, so the fact that there is one SM pending may not reflect the actual attainability state of the mobile terminal device. In case of e.g. ten or more short messages pending, it can be sure that the mobile telephone is actually not attainable.

If only the SMSC is queried for pending SMs the result of said query can be "no SMs pending", but actually the mobile station is not attainable because it is actually turned off, and no new SMs have been sent in the meantime. So the basic information "no SMs pending" is only a minimum requirement, but may not be sufficient information for determining the attainability.

Preferably, said data are related to the connection state of said mobile terminal device. So it can be determined, if the mobile terminal device can be connected via communication modes such as GSM, GPRS, UMTS and the like. This way some bulk transfers can be suppressed if they can not be delivered through GPRS. In this case an application or a device wants to know if the phone is online—or maybe connected for GPRS or not, and use that information for a communication attempt such as sending a message, voice-calls, sending a fax, e-mails, Wireless Application Protocol- (WAP)-decks or something like that.

Conveniently, said data are location related. It can be useful for an application or a device to find out if the mobile station (MS) is roaming abroad or not, and then make decisions based on that: not send the football scores, not download the software, etc. if the mobile terminal is actually abroad etc.

Preferably, said evaluation comprises the evaluation of data related to the communication to be attempted. So the kind of communication attempt and the amount of data to be delivered can be taken into account to decide if the mobile terminal is actually attainable or not. So a single SM may be delivered, even if there are messages already pending, while an MM may be cancelled, if the same number of MMs are pending.

Advantageously, said query is executed by initiating a mobile terminated delivery attempt to said SMSC. This embodiment of the invention allows an application to find out if a mobile terminal is attainable without actually contacting the mobile terminal. The SMSC does this by initiating the MT delivery attempt but not finishing it. Rather, it tells the application instead if the HLR thinks the handset is reachable or not. The method can be embodied by submitting an AO ("command cannot be actioned" or "reserved for future use") message to the SMSC with a special flag to activate the "query-HLR-status-only". The SMSC checks its own information if the MS is reachable; if other messages are pending already and currently no delivery attempt is made, the SMSC can send the 'not-reacheable' info back using the last known mobile terminated (MT)-delivery attempt reason (e.g. "absent subscriber"). Otherwise the SMSC asks the HLR for the routing information. The HLR reply actually tells where the mobile is, but also if the mobile is reachable or not. It can also tell if the mobile can be reached via the GPRS network or through the GSM network. The SMSC in this case would not do the usual: it does not actually deliver the MT message to the mobile terminal (if reachable), but generates the notification back to the application or network device and deletes the message.

According to another aspect of the present invention, a software tool for executing a communication attempt with a mobile terminal device in accordance with the attainability status of said mobile terminal device in a cellular communication network is provided, which comprises program code means for performing all of the steps of the preceding description when said program is run on a computer or a network device.

According to another aspect of the present invention, a computer program for executing a communication attempt with a mobile terminal device in accordance with the attainability status of said mobile terminal device in a cellular communication network is provided, which comprises program code means for performing all of the steps of the preceding description when said program is run on a computer or a network device.

According to yet another aspect of the invention, a computer program product is provided, comprising program code means stored on a computer readable medium for carrying out the method for executing a communication attempt with a mobile terminal device in accordance with the attainability status of said mobile terminal device in a cellular communication network is provided of the preceding description when said program product is run on a computer or a network device.

Preferably, the computer program and the computer program product are distributed in different parts and devices of the network. The computer program and the computer product device run in different devices of the network. Therefore, the computer program and the device executing said computer program have to be different in abilities and source code.

According to another embodiment of the invention a Short Message Service Center (SMSC) is provided, that is capable of executing the steps of the method of the preceding description. The SMSC is connected to a cellular communication network that comprises a Home Location Register (HLR). The SMSC comprises components for receiving messages, forwarding messages, and querying HLR data of a mobile terminal device. The SMSC further comprises components for obtaining data related to the attainability status of a mobile terminal device, and delivering messages according to said obtained data related to the attainability status of said terminal device.

Preferably, the SMSC further comprises a component for evaluating said data related to the attainability status of a mobile terminal device, to obtain a attainability status. The SMSC can use the result of the evaluation to deliver the communication attempt or not. The SMSC can decide by itself, if a communication attempt is to be delivered or not.

Conveniently, the SMSC further comprises a component for generating a message according to results from the said evaluating component. The SMSC may transfer the result of the evaluation to a network device, in which case the delivery attempt would be the delivery attempt of the result. The message can be used to inform an originator of the communication attempt of the delivery, e.g. by sending a message containing the result, and the start, cancel or delay said delivery attempt.

According to another embodiment of the present invention, a network device is provided. The network device is connected to an SMSC of a cellular communication network. The network device comprises components for sending and receiving messages, generating a message for querying a SMSC for data related to a mobile terminal device and transferring said data to said network device, obtaining an attainability status from said tranferred data, delivering communication attempts according to said attainability status, and cancelling communication attempts. The network device can be directly connected to the SMSC, via the cellular communication network, or via a gateway. The network device can be can be a network broadcast service or the like and can be incorporated in the SMSC, or can be an external device connected to the SMSC.

Preferably, said network further comprises a Home Location Register (HLR), and said network device further comprises a component for generating a message for inducing said SMSC to query HLR data of said mobile terminal device and transferring said data to said network device. So the network device may indirectly query HLR data via the SMSC. The device may be capable of directly connecting the HLR register, but this may be inadvisable for reasons like data protection, protection of privacy and the like.

BRIEF DESCRIPTION OF THE DRAWINGS

In the following, the invention will be described in detail by referring to the enclosed drawings in which.

BEST MODE FOR CARRYING OUT THE INVENTION

Figure 1A:
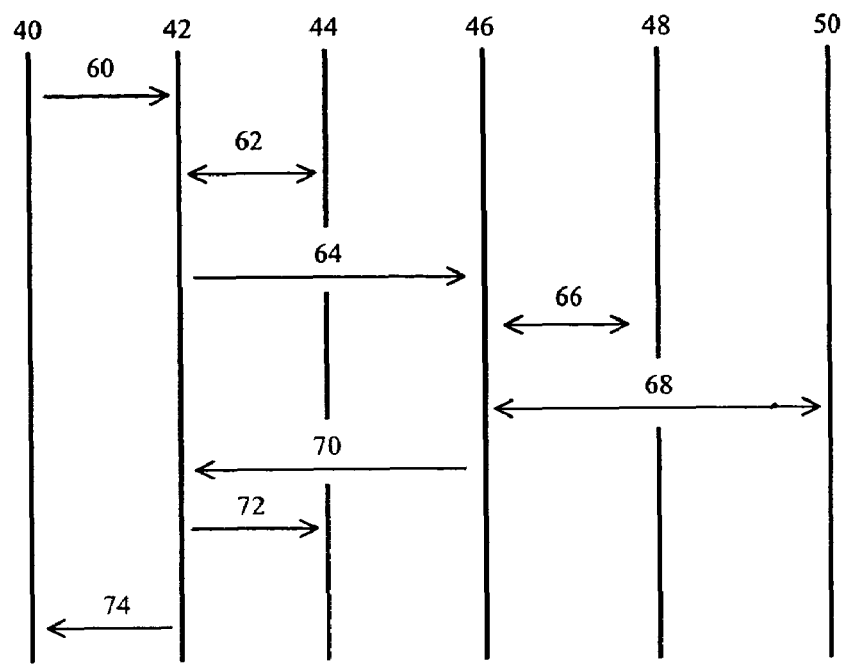
FIG. 1A is a flowchart of the conventional delivery of an SM in a cellular communication network.

FIG. 1A is a flowchart of the conventional delivery of an SM in a cellular communication network. In the first step a service center (SC) 40 transfers a message 60 to a short message service center (SMSC) 42. The SMSC 42 receives the SM and inspects the parameters. The SMSC 42 may be identical to, or be incorporated in a mobile service center (MSC). The SMSC 42 queries 62 the home location register (HLR) 44, and transfers 64 the SM to the MSC 46 using the routing information obtained from the HLR 44, if no errors occur. When receiving a SM from the SMSC 42, the MSC 46 retrieves 66 from the visitor location register (VLR) 48 location area address information and, when appropriate, error information. If no errors are indicated by the VLR 48, the SM is transferred 68 from the MSC 46 to the mobile station (MS) 50. Then the MS 50 transfers 68 a confirmation that the SM is received by the MS 50 to the MSC 46. The MSC 46 then relays the delivery confirmation to the SMSC 42 in a delivery report 70. When receiving the report 70 associated with said SM from the MSC 46, the SMSC 42 notifies the HLR 44 of the successful delivery via the MSC 46, and creates and sends the successful report 74 to the SC 40. These steps are executed if no errors occur during the delivery of the SM. If e.g. the MS 50 rejects the SM since e.g. it has no memory capacity available to store the message, or for any other reason, all these steps are futile and network and air time resources are wasted.

Figure 1B:
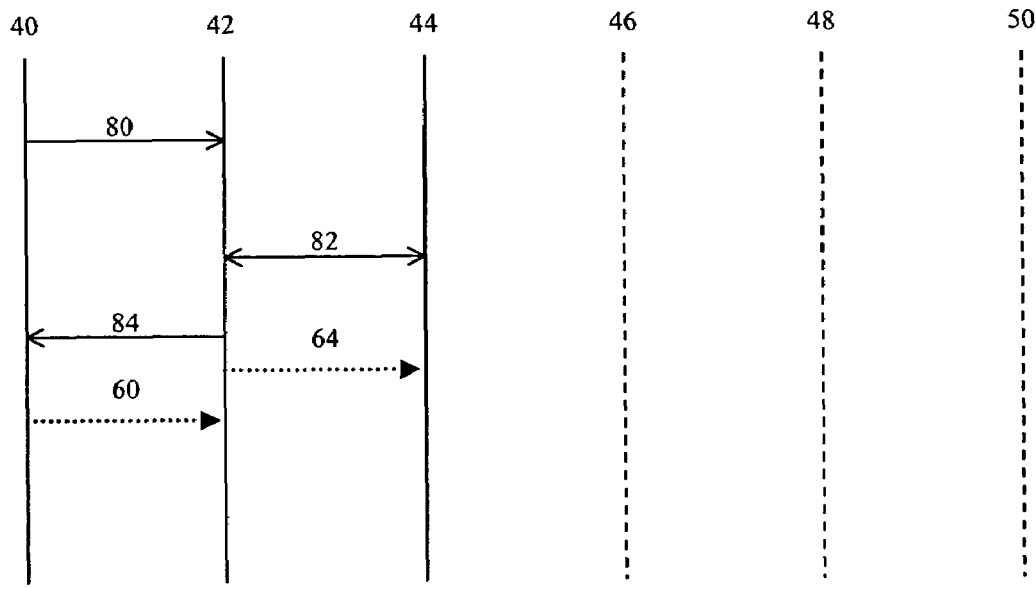
FIG. 1B is a flowchart of an attainability determination method according to one embodiment of the present invention.

FIG. 1B is a flowchart of an attainability determination method according to one embodiment of the present invention, providing a method to prevent the waste of network resources. In the first step the SC 40 submits an AO message 80 ("command cannot be actioned" or "reserved for future use") to the SMSC 42 with a special flag to activate the 'query-HLR-status-only'. The SMSC 42 checks its own information if the MS 50 is attainable, if other messages are pending already, and if pending currently no delivery attempt is made. The SMSC 42 can send 84 the 'not-attainable' back to the SC 40 using the last known mobile terminated delivery attempt reason (for example 'absent subscriber'). Otherwise the SMSC 42 asks 82 the HLR 44 for the routing information. The HLR 44 reply 82 actually tells where the mobile is, but also if the mobile is reacheable or not. It can also tell if the mobile can be reached via the GPRS network or through the GSM network.

The SMSC 42 in this case would not do the usual, in that it does not actually deliver the mobile terminated (MT) message to the MS 50 (if reacheable), but generates the notification 84 back to the SC 40 and deletes the message. Preferably, the SC 40 can start to send 60 an SM or Multi-SMs for delivery, as described in FIG. 1A. Preferably, the SMSC 42 can deliver 62 the SM by itself, e.g. after confirmation from the SC 40.

Figure 2A:
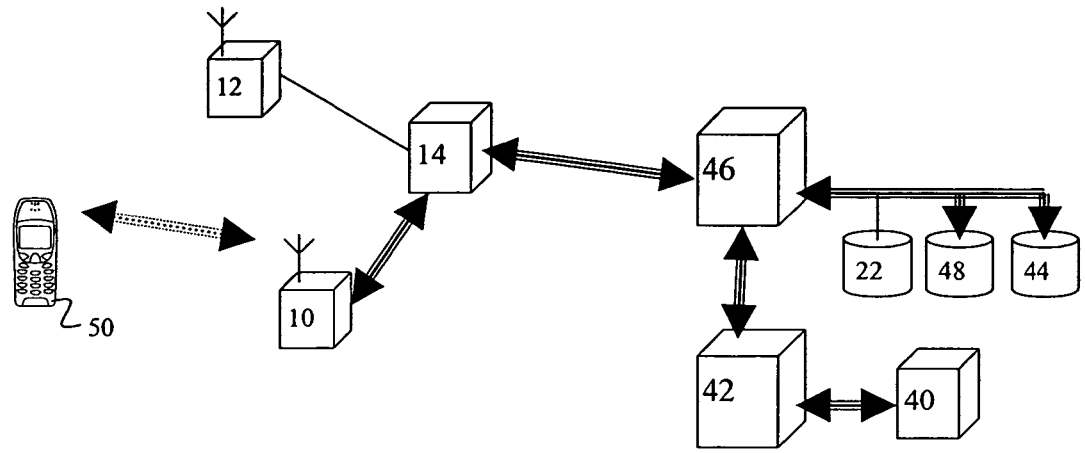
FIG. 2A and FIG. 2B are block diagrams a cellular network architecture with an indication of the steps necessary to determine the attainability of a mobile terminal device according to the sate of the art (FIG. 2A) and according to an embodiment of the present invention (FIG. 2B).
Figure 2B:
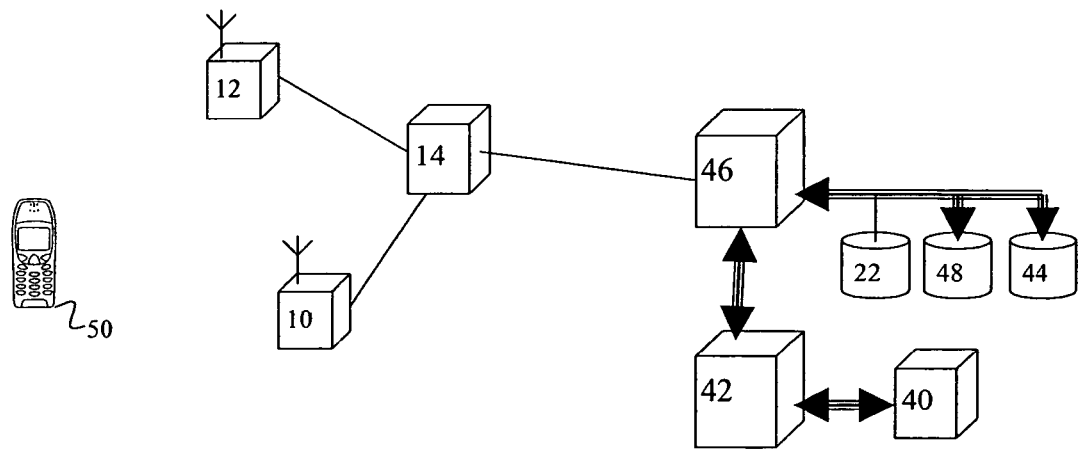

FIGS. 2A and 2B are block diagrams a cellular network architecture with an indication of the steps necessary to determine the attainability of a mobile terminal device according to the state of the art and according to an embodiment of the present invention. In FIG. 2A a section of a conventional cellular network is depicted with a mobile station (MS) 50, two base stations 10, 12 and a base station controller (BSC) 14 a mobile switching center (MSC) 46. The MSC 46 is connected to home location register (HLR) 44, a visited location register (VLR) 48 and other data bases like equipment identity register and an authentication center, concurrently designated with the reference numeral 22. The MSC 46 is connected to a short message service center (SMSC) 42. The SMSC 42 can be a SMS-GMSC, a SM-service gateway MSC, connecting an service center (SC) 40 e.g. in the internet with the SMSC 42. The SC 40 can be located in the cellular network or in adjacent network. Preferably, the MSC the SMSC and the SC can be implemented in a single network device. The connections required to deliver a standard SMS are indicated by bold double arrows.

FIG. 2B depicts the same cellular network section as FIG. 2A, with the difference that only the connections required to determine the attainability of the MS 50 are indicated by bold double arrows.

The invention provides the following advantages for the service provider:
- the attainability notification is sent to the application without using any air-interface resources and without leaving any trace in the handset;
- applications can find out if a phone can be contacted via GPRS now. This might stimulate application originated GPRS based services; and
- no changes are required to GSM/GPRS network elements or mobile terminals; only the SMSC is affected.

One benefit is that the user does not have to get rid of these SMs pushed just to find out the status of the mobile terminal.

It is to be noted that this feature may not be intended to first query using the mechanism described here, and then send only one message to the phone, because the expense of executing the method for a single short message may not be worthwhile.

It is to be noted that the method can be used to simply track a mobile terminal device, to track its motion, without disturbing the mobile terminal simply by repeatedly executing the method according to the invention. In this case the communication attempt is cancelled anyway, and a notification to a network device is generated and sent, (e.g. periodically) notifying the actual position and attainability of said mobile terminal device.

It is to be noted that the method may be used to avoid bottlenecks in the delivery of messages, as it can simply be detected how many terminal devices are located in a single cell, and if the delivery of broadcast messages would lead to a data overflow in a single cell.

It is to be noted that the communication attempt can be a two way communication like a voicecall, or an acknowledged SM, or the like, or can be a one way communication such as a paging call or broadcast SMs.

It is further to be noted that the SMSC can be a SMS-GMSC, a Short Message System—Gateway Mobile service Switching Center, providing a gateway option to other data networks, like e.g. the internet, or a local area network of a news or data provider.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Method comprising:
    a service center providing a querying to a short message service center in a cellular network for obtaining attainability status of a mobile terminal device in order to determine whether to deliver a communication to said mobile terminal device,
    said short message service center responding to the query by evaluating connection related data stored in said short message service center, wherein said connection related data is related to messages pending for delivery to said mobile terminal device, and
    if said mobile terminal device is attainable delivering said communication to said short message service center for delivering to said mobile terminal device,
    wherein in response to said query to said short message service center, the short message service center queries a home location register of the cellular communication network for an attainability status of said mobile terminal device and wherein said attainability status is obtained by evaluating connection related data stored in said home location register.

2. Method according to claim 1, wherein said connection related data are indicative of a connection state of said mobile terminal device.

3. Method according to claim 1, wherein said connection related data are indicative of a location of the mobile terminal device.

4. Method according to claim 1, wherein said evaluating the connection related data comprises evaluating data related to the communication.

5. Method according to claim 1, wherein said query to said short message service center comprises a short message to said short message service center, said short message being destined for said mobile terminal device.

6. Software tool for determining attainability of a mobile terminal device in a cellular communication network having a short message service center for subsequently executing a communication with the mobile terminal device in accordance with the attainability status of said mobile terminal device, comprising program code means for carrying out the method of claim 1, wherein said software tool is implemented in a program run on the short message service center, a service center or a network device.

7. Computer readable medium program for determining attainability status of a mobile terminal device in a cellular communication network having a short message service center for subsequently executing a communication with the mobile terminal device in accordance with the attainability status of said mobile terminal device, comprising program code means for carrying out the method of claim 1, wherein said program is configured to run on the short message service center, a service center or a network device.

8. Computer readable medium program product comprising program code means stored on a computer readable medium for carrying out the method of claim 1, wherein said program product is configured to run on the short message service center, a service center or a network device.

9. A short message service center, connectable to a cellular communication network comprising a service center and a home location register, comprising:
    a component for responding to a query from the service center for obtaining attainability status of a mobile terminal device,
    a component for querying the home location register to obtain connection related data of the mobile terminal device and evaluating said connection related data to obtain an attainability status of the mobile terminal device, said connection related data being related to messages pending for delivery to said mobile terminal device, and
    a component for receiving a communication from the service center and delivering said communications to the mobile terminal device if the mobile terminal device is attainable for receiving said communication and
    a component for generating a message to the service center according to results from evaluating the connection related data.

10. Network device connectable to a short message service center of a cellular communication network, comprising:
    a component for generating a message for querying the short message service center for data related to messages pending for delivery to a mobile terminal device,
    a component for receiving an attainability status of said mobile terminal device from said short message service center, and
    a component for delivering a communication to the short message service center for delivery to said mobile terminal device if said mobile terminal device is attainable for receiving said communication,
    wherein said cellular network further comprises a home location register, and wherein said network device further comprises a component for generating a message for inducing said short message service center to query home location register data of said mobile terminal device and for transferring said data to said network device.

11. A short message service center, connectable to a cellular communication network comprising a service center and a home location register, comprising:

means for responding to a query from the service center for obtaining attainability status of a mobile terminal device, means for querying the home location register to obtain connection related data of the mobile terminal device and evaluating said connection related data to obtain an attainability status of the mobile terminal device, said connection related data being related to messages pending for delivery to said mobile terminal device, means for receiving a communication from the service center and delivering said communications to the mobile terminal device if the mobile terminal device is attainable for receiving said communication, and means for generating a message to the service center according to results from evaluating the connection related data.

12. Network device connectable to a short message service center of a cellular communication network, comprising:

means for generating a message for querying the short message service center for data related to messages pending for delivery to a mobile terminal device, means for receiving an attainability status of said mobile terminal device from said short message service center, and means for delivering a communication to the short message service center for delivery to the mobile terminal device if the mobile terminal device is attainable for receiving said communication, wherein said cellular network further comprises a home location register, and wherein said network device further comprises means for generating a message for inducing said short message service center to query home location register data of said mobile terminal device and for transferring said data to said network device.

* * * * *